United States Patent
Krishna Murthy et al.

(10) Patent No.: US 11,074,347 B2
(45) Date of Patent: Jul. 27, 2021

(54) SYSTEM SUBSET VERSION AND AUTHENTICATION FOR REMOTELY CONNECTED DEVICES

(71) Applicant: Itron, Inc., Liberty Lake, WA (US)

(72) Inventors: Adithya Krishna Murthy, Bangalore (IN); Brett McDonald, West Union, SC (US); Krishna Vinay Gambali, Bangalore (IN); Daniel Sullivan, Seneca, SC (US); Kevin David Guthrie, Seneca, SC (US)

(73) Assignee: Itron, Inc., Liberty Lake, WA (US)

( * ) Notice: Subject to any disclaimer, the term of this patent is extended or adjusted under 35 U.S.C. 154(b) by 119 days.

(21) Appl. No.: 16/298,010

(22) Filed: Mar. 11, 2019

(65) Prior Publication Data
US 2020/0293658 A1 Sep. 17, 2020

(51) Int. Cl.
*G06F 21/57* (2013.01)
*G06F 16/18* (2019.01)
(Continued)

(52) U.S. Cl.
CPC .............. *G06F 21/572* (2013.01); *G06F 8/65* (2013.01); *G06F 16/137* (2019.01);
(Continued)

(58) Field of Classification Search
CPC .. G06F 21/572; G06F 16/1873; G06F 16/137; G06F 16/2365; G06F 16/152;
(Continued)

(56) References Cited

U.S. PATENT DOCUMENTS 6,925,566 B1 8/2005 Feigen et al.
8,938,730 B2 1/2015 McDonald et al.
(Continued)

FOREIGN PATENT DOCUMENTS

CN 107577948 A 1/2018

OTHER PUBLICATIONS

Jongboom et. al., "Enabling Firmware Updates over LPWANs", Dec. 2018, Retrieved from Internet: URL:http://janjongboom.com/downloads/ew201 ; 3 pages.
(Continued)

*Primary Examiner* — Kambiz Zand
*Assistant Examiner* — Aubrey H Wyszynski
(74) *Attorney, Agent, or Firm* — Lee & Hayes, P.C.

(57) ABSTRACT

A delta file may be assembled for use in updating software on a networked device. The delta file may include at least one manifest, and each manifest may be associated with a subset of files (e.g., replacement and/or upgrade files for the networked device). The subset(s) of files may be selected based on a wide range of criteria. In an example, subsets may be selected based on rules that regulate when files are allowed to change. Subsets may also be defined based on the device associated with the files (e.g., a metrology device or a communications device). Any desired criteria/criterion may be used to define a subset of files. The delta file may be transmitted to the networked device. On the networked device, the subset(s) of files may be verified against data corruption, actions of bad actors, and/or unexpected changes at runtime.

20 Claims, 7 Drawing Sheets

(51) Int. Cl.
  *G06F 16/13* (2019.01)
  *G06F 16/23* (2019.01)
  *G06F 16/14* (2019.01)
  *G06F 8/65* (2018.01)
  *G06F 21/56* (2013.01)
  *H04L 29/08* (2006.01)

(52) U.S. Cl.
  CPC ........ *G06F 16/152* (2019.01); *G06F 16/1873* (2019.01); *G06F 16/2365* (2019.01); *G06F 21/565* (2013.01); *H04L 67/125* (2013.01)

(58) Field of Classification Search
  CPC .......... G06F 8/65; G06F 21/565; G06F 8/658; G06F 11/00; G06F 21/64; H04L 67/125; H04L 69/40; H04L 67/06; H04L 67/34; H04L 67/12; H04W 12/009; H04W 12/1006; H04W 4/70
  USPC .......................................................... 726/23
  See application file for complete search history.

(56) References Cited

U.S. PATENT DOCUMENTS

| | | | |
|---|---|---|---|
| 10,496,494 B1* | 12/2019 | Haloi | G06F 16/148 |
| 2012/0266156 A1* | 10/2012 | Spivak | H04L 67/34 |
| | | | 717/172 |
| 2017/0272485 A1* | 9/2017 | Gordon | H04L 65/601 |
| 2018/0046395 A1* | 2/2018 | Sekimoto | G05B 19/0423 |

OTHER PUBLICATIONS

Kachman, et. al., "Effective Over-the-Air Reprogramming for Low-Power Devices in Cyber-Physical Systems", In: "IFIP Advances in Information and Communication Technology", Apr. 2016, vol. 470, Figure 2, pp. 284-292.

PCT Search Report and Written Opinion dated May 19, 2020 for PCT Application No. PCT/US2020/021880, 36 pages.

* cited by examiner

SYSTEM SUBSET VERSION AND AUTHENTICATION FOR REMOTELY CONNECTED DEVICES

BACKGROUND

Networked devices may take many forms, generally encompassed within the internet of things. Example devices include smart utility (electricity, gas, water) meters, appliances, and vehicles to name just a few. Such networked devices may contain numerous executable and/or data files, many of which may change over time. Changes may occur to such files prior to installation in a device, at software update of the device, and/or at run time of the device. Such changes may be appropriate and authorized, or malicious and/or unauthorized. If not prevented, such malicious and/or unauthorized changes can lead to reduced performance, loss of control, and/or spreading of viruses or malware to other devices on the network.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes techniques for assembling a delta file—including a plurality of executable and/or data files—for transmission to, and upgrade of, a networked device. Also described are techniques for verifying the integrity of the files upon receipt at the networked device. In one example, the networked devices are part of the internet of things—and accordingly may include almost any networked objects, such as retail inventory, consumers' possessions, etc. In another example, the devices are part of a smart utility grid, which may be related to the supply of electricity, gas, water, etc.

Such devices, whether part of the internet of things and/or part of a smart utility grid and/or network, may require software, firmware and/or informational data updates. Provision of such updates introduces a number of issues. Many networks have very low data-transfer rates. Accordingly, any update may put considerable burden on the data-transfer infrastructure, and in some cases, the battery-operated power supplies of the networked devices. Additionally, there is an issue of the accuracy of the files transferred, both in terms of possible errors introduced by the network, and in terms of possible deliberate changes to files made by bad actors.

In one example of the devices and techniques discussed herein, a network device may be configured with a processor and a memory device in communication with the processor. The memory device may store a plurality of files and a delta file. The delta file may include a first manifest and a second manifest, having a first expected hash value of a first subset of files and a second expected hash value of a second subset of files, respectively. The delta file may also include the first subset of files associated with the first manifest and the second subset of files associated with the second manifest. The first subset of files and the second subset of files may include replacements for at least some of the plurality of files on the networked device. The networked device may also have in memory (e.g., from the delta file or other source) instructions that, when executed by the processor, perform a method. The method may include hashing at least some of the files in the first subset of files to calculate a first calculated hash value; hashing at least some of the files in the second subset of files to calculate a second calculated hash value; comparing the first expected hash value to the first calculated hash value; comparing the second expected hash value to the second calculated hash value; determining, based at least in part on comparing the first expected hash value to the first calculated hash value, or based at least in part on comparing the second expected hash value to the second calculated hash value, that at least one of the first subset of files or the second subset of files is invalid; and based at least in part on the determination of invalidity: reporting the determination of invalidity; and continuing to use previously installed files without using files from at least one of the first subset of files and the second subset of files.

In an example, the network device may—based at least in part on the determination of invalidity—the additionally activate a shut-off switch or valve to prevent consumption of a metered commodity. In an example, the first subset of files may comprise files that are changeable only at runtime; and the second subset of files comprise files that are changeable only in response to a system upgrade. In an example, the delta file may additionally comprise: a plurality of paths to a plurality of respective files within the first subset of files and the second subset of files. In an example, the first subset of files may comprise files that, upon execution, cause operation of a metrology unit; and the second subset of files comprises files that, upon execution, cause operation of a communications unit. In an example, the delta file may be configured to update less than all of the plurality of files stored on the memory device; and the first subset of files may comprise files that are executable to operate a first hardware component, and the second subset of files comprises files that are executable to operate as at least part of an operating system of the network device. In an example, the delta file may additionally comprise: a first version number associated with the first subset of files and a second version number associated with the second subset of files.

Example System and Techniques

Figure 1:
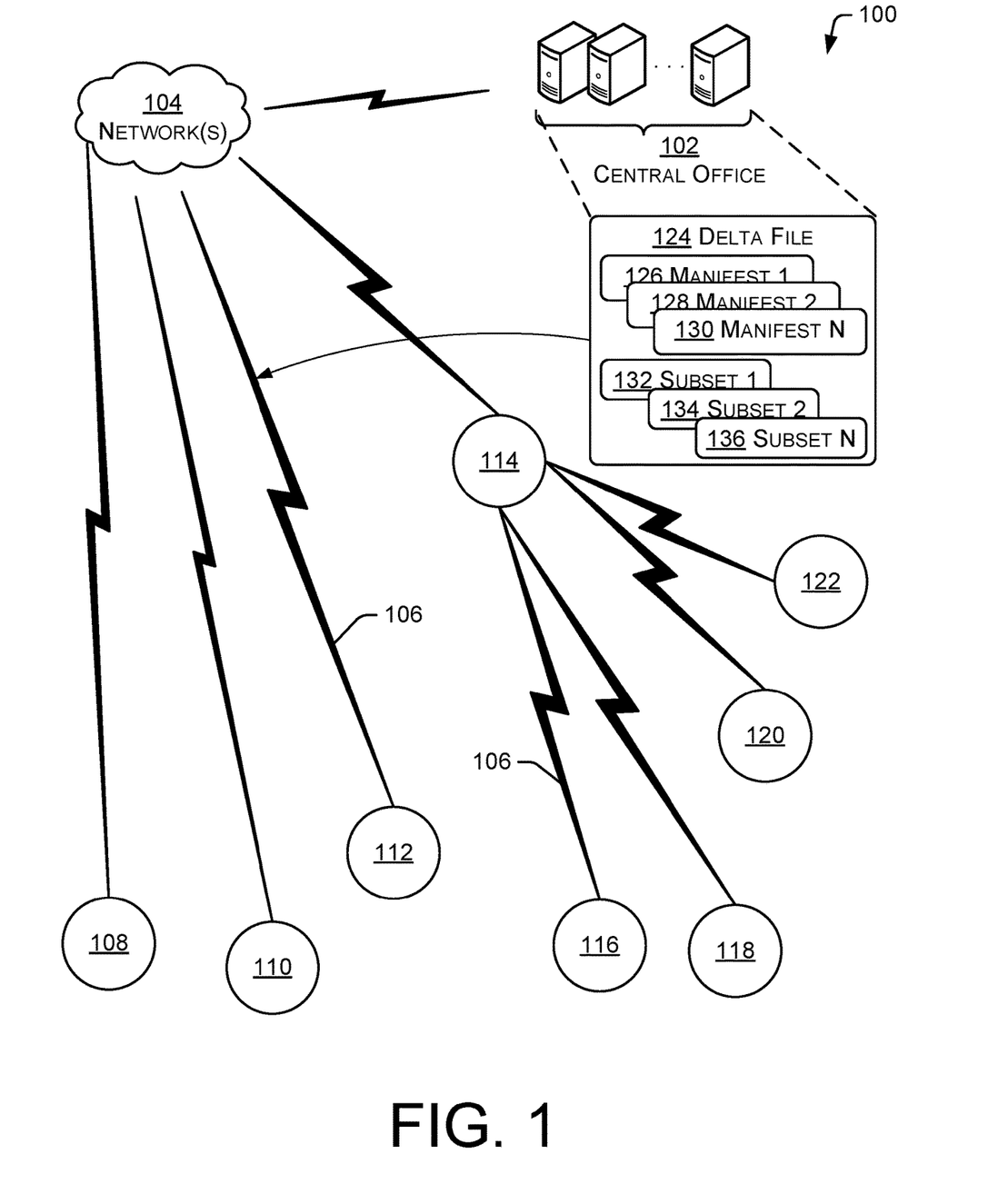
FIG. 1 is a schematic diagram showing an example network, including a central office, a plurality of endpoints, and showing transmission of a delta file having an update for one or more of the endpoints.

FIG. 1 shows an example network 100, including a central office 102, a plurality of endpoints 108-122, and showing transmission of a delta file 124 having an update for one or more of the endpoints. The delta file 124 may be created at the central office 102 and transmitted via network connection 106 to an endpoint and/or networked device 112. In the example shown, a network 104 may be the internet, a proprietary network, or a combination. The communication 106 may be made in part by wired or optical connections, but may also be made by radio frequency (RF) linkages. In an example of a smart utility network, electric, gas and/or water meters may communicate over RF connections with a data collector. In the network 100 shown, the node 114 may function as a relay node or as a data collector node. A data collector node may communicate over RF connections to a plurality of downstream nodes or endpoints, and then forward the information upstream. Such a data collection node may differ from a relay node in that it is dedicated to data collection and data transfer, and does not have a utility metering function.

FIG. 1 shows an example delta file 124, which may be sent by the central office 102 to one or more downstream nodes 108-122. The delta file 124 may include changes to, and/or replacements for, files in memory devices of the one or more downstream nodes (e.g., "targets," endpoints, edge devices, networked devices, etc.). The changes may include full or partial files, which may be used to replace respective existing files or portions of existing files, or to add additional files to the networked device.

In the example shown, the delta file 124 contains three manifests 126, 128, 130. Each manifest is associated with a subset of files, e.g., a subset of the files, some, all or none of which may already be installed on the destination endpoint. In the example, manifests 126, 128, 130 are associated with subsets of files (i.e., binaries) 132, 134, 136, respectively. Each manifest 126, 128, 130 contains metadata about files in a respective subset 132, 134, 136. The metadata may include version numbers of the subset, file path(s) to file(s) within the subset, and a hash value of an entire subset of files and/or of individual files within the subset. In operation, files associated with each manifest may be used to replace and/or update respective or associated files already on the endpoint. In the example shown, the subset of files 132 is associated with (but not included within) the manifest 126. The subset 132 may be used to update files on the endpoint 112.

Figure 2:
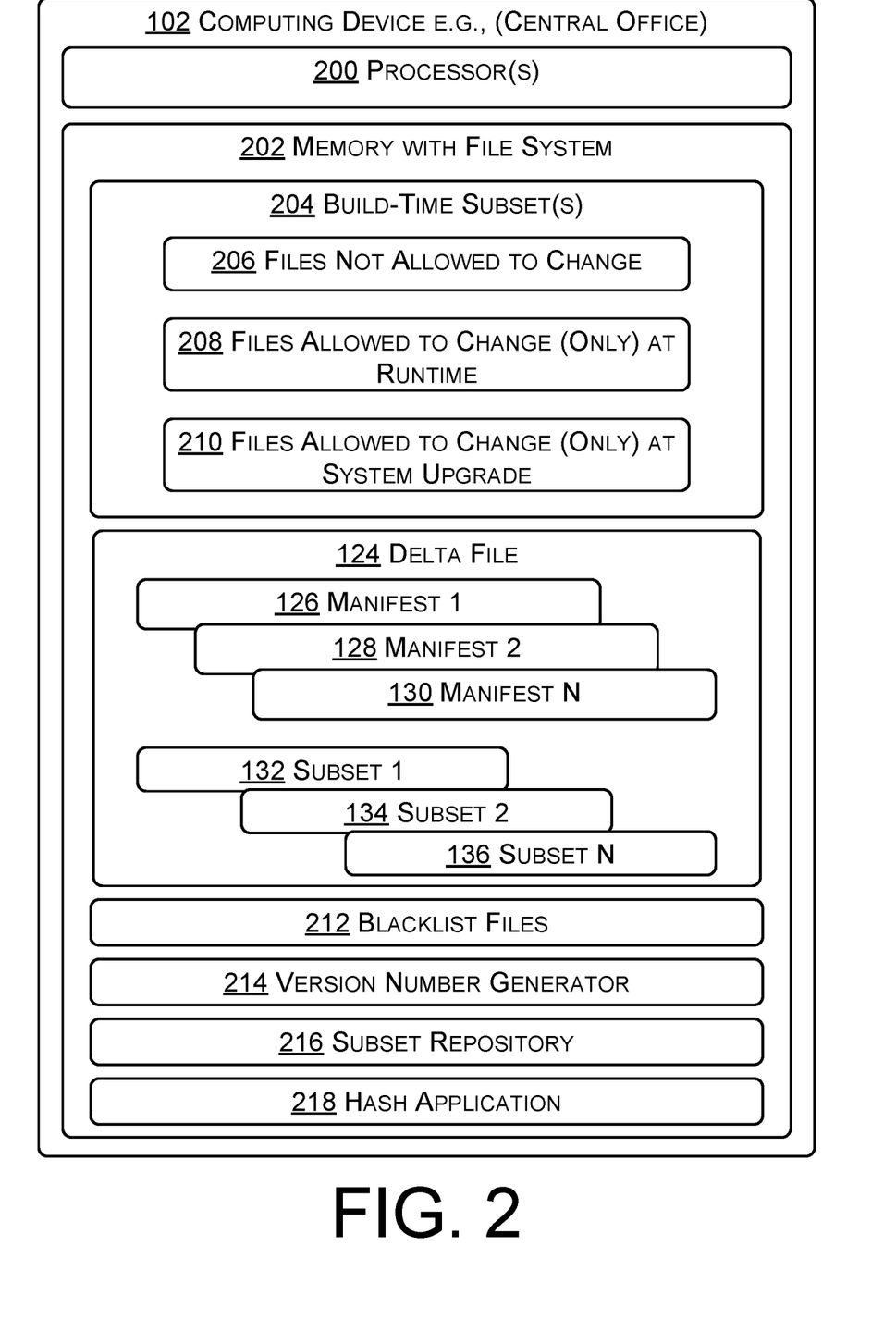
FIG. 2 is a block diagram showing an example of a computing device (e.g., a server) configured to update and manage a plurality of endpoints in a networked environment.

FIG. 2 shows an example of the computing device 102 configured to update and manage a plurality of endpoints in a networked environment. In the example of FIG. 1, the computing device 102 is a central office, but the computing device may alternatively be a data collector in the field, a hand-held module used by a technician to perform software maintenance, or any other computing device. In the example shown, the computing device had one or more processors 200 and one or more memory devices 202. As used herein memory may include read-only memory, random-access memory, flash-memory, storage memory, or other forms of memory used in computing devices.

In the example shown, build-time subset(s) 204 are located in the file system defined in the memory device 202 of the computing device. The build-time subsets 204, may include upgrades for the files defined on memory of downstream endpoint devices, such as metrology or other IoT devices. The upgrades may be replacement files or additional files for the IoT devices. In the example shown, the build-time subsets include three subsets 206, 208, 210. Once the build-time subsets are completed, with appropriate versions of appropriate files recorded in appropriate manifests, the subsets may be configured within the delta file 124 for transmission to one or more downstream devices. In examples, each subset of files may be defined in any useful manner, such as by file size, file purpose, file age, file type, etc. By defining subsets of files in useful manners, the update of downstream endpoints/networked devices may be more efficiently performed.

In the example shown, three subsets of files 206, 208, 210 are shown. While almost any criterion or criteria could be used to configure a subset of files for transmission to downstream device(s), the example shows subsets based on a subset of files not allowed to change 206, a subset of files allowed to change at (or only at) run time 208, and a subset of files allowed to change only at (or only at) system upgrade 210. Examples of files not allowed to change may include files that are related to financially (i.e., "legally") relevant matters, such as the measurement of gas, water or electricity. Such metering-related files may have to undergo extensive testing and regulatory approval before they are allowed to be replaced by newer versions. Other files may be allowed to change in an update process. Examples of such files include third-party applications that provide consumers with feedback on their energy usage. Other files may be allowed to change at runtime, such as data files that contain information regarding the weather, the time, or data used to support third-party applications.

The subsets of files may be formed by some common feature or utility of the files. In the example of subsets 206, 208, 210, the common feature or criterion is conditions wherein the files can be changed. In a further example, files associated with the operation of metrology, metering or measuring devices could be grouped into a subset. A further subset could be formed from files associated with the operation of radio or other communication devices. A further subset could be formed from files associated with the operation of low-level software, operating systems, drivers and utilities. Other subsets could easily be defined. Advantageously, by defining desired numbers of subsets of the files operating on an endpoint device, a delta file having a size that is smaller than a total of all files on the endpoint can be constructed. Such subsets of files, included in an associated delta file, are far more quickly transmitted, and result in far less network burden, than complete software replacement at the endpoint. This is particularly advantageous in networks that may have relatively slow transmission speeds and/or where network devices are battery-powered.

A delta file 124 is configured at build-time to include incremental changes to one or more executable and/or data files. The delta file 124 may include only parts of files, i.e., the change or "delta" to such files. This allows only the changed portions of certain files (or entire smaller files). The delta file may include a plurality of manifests; in the example shown as manifests 126, 128, 130. Each manifest may be associated with a subset of files. In the example, the subset 132 is shown associated with the manifest 130. Each manifest may include a version number of the subset (and possibly a version number of each file in the subset), a hash of the subset (and possibly a hash of each file in the subset), and pathways to files within each subset. In an example, pathways may indicate directories and/or nested directories, in which files are, or should be, located.

A delta file 124 may be configured for each network endpoint, or a same delta file may be used for two or more endpoints. The delta files(s) 124 may include a plurality of subsets of files, an associated plurality of manifests having metadata on a respective subset (version number, hash, paths, etc.). The delta file may also include update files not associated with a subset, and other files such as install scripts and metadata.

A blacklist 212 is a listing of files that, when hashed, do not reliably return the same result. That is, the files on the blacklist 212 tend to change somewhat, in terms of included data, settings, etc., and therefore do not reliably return the same hash result. Accordingly, by removing the blacklist files from the files to be hashed, the hash of a subset of files, and the hash of each file in the subset, is more reliable. The blacklist files 212 may be changed as circumstances indicate. In one example, the blacklist 212 is sent to the target device, e.g., network endpoint. The blacklist allows the target device to remove files from the hash process. In an alternative example, the target device does not receive the blacklist 212, and instead hashes only those files for which an expected hash result was received by the target device.

A version number generator 218 generates a version number for each subset. If there is a change in the subset, as compared to a previous hash of the subset of files, then a new version number is generated. If there is no change in the hash from a previous hash of the same subset, then a new version number is not generated. Version numbers may be written to the appropriate manifest within the delta file, and transferred to a database on the endpoint.

A subset repository 216 is used to store a copy of each subset of files (optionally including those removed by using the blacklist 212) having a distinct version number. Accordingly, if a hash value of the subset of files is unchanged, that subset may have been previously stored in the subset repository with a version number. However, if the hash of the files of the subset has changed from a previous version of the subset (or the subset is new and/or different), the new version of the subset, together with a new version number, is stored in the repository.

A hash application 218 may be used to hash each subset of files and/or each file within a subset. The hash of each file or subset of files may be included in the manifest. Each of a plurality of manifests may be contained in the delta file 124, which can be sent to an appropriate network endpoint.

Figure 3:
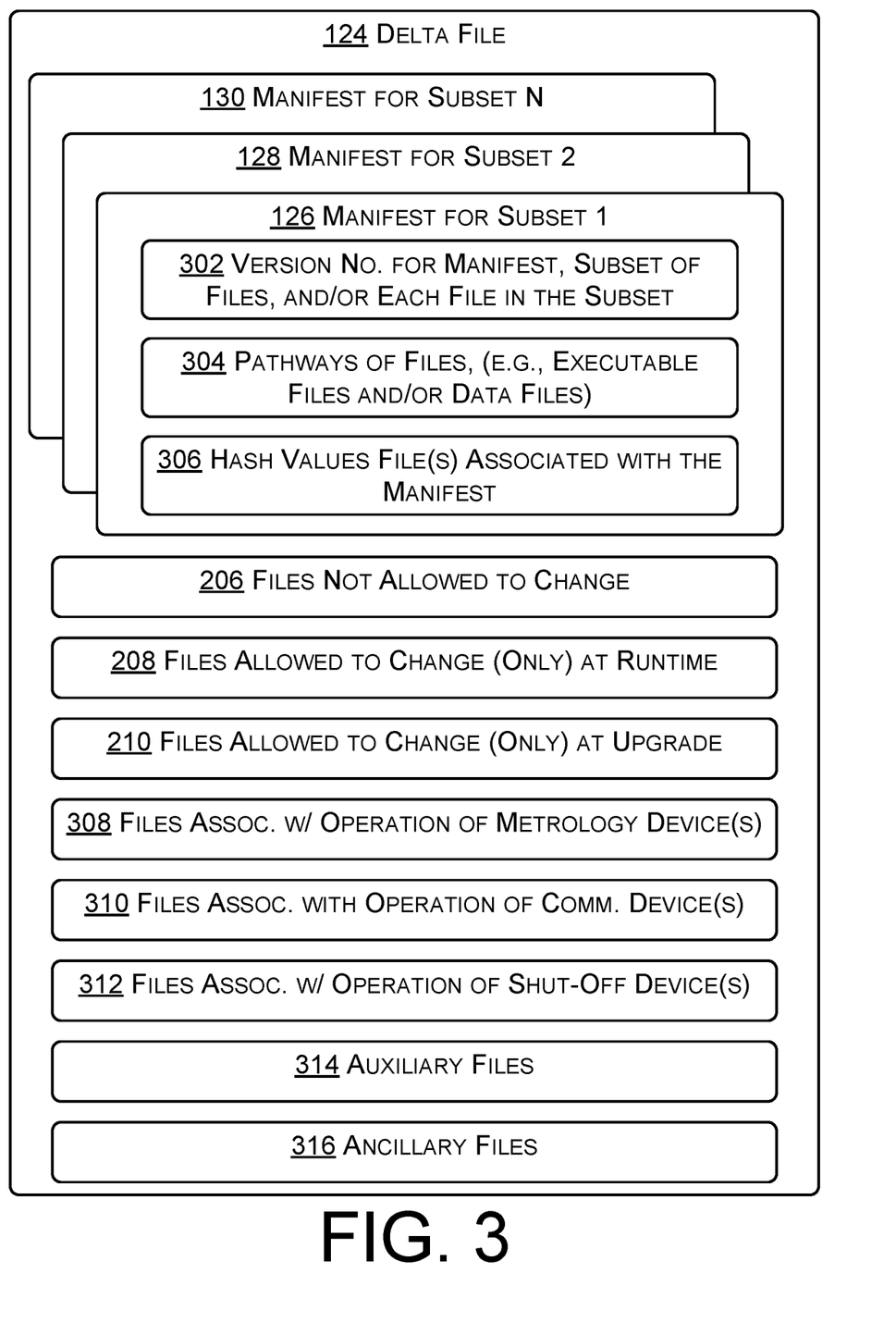
FIG. 3 is a block diagram showing an example of a delta file used to update one or more endpoints in the networked environment.

FIG. 3 shows an example of a delta file 124 used to update one or more endpoints in the networked environment. While a particular organization of the information presented, other organizations for the same or similar information could be utilized. Accordingly, the presented organization of the delta file 124 should be considered an example representation illustrating broader concepts. In the example shown, three manifests 126, 128, 130 are illustrated, each manifest associated with a respective one of three different subsets of files. In one example, the manifest 126 is associated with subset 302 of files, which include files not allowed to change. Such files may be "legally relevant," in that they may operate the measurement and/or metrology devices of a metering device, and the customer's bill results from their operation. Accordingly, they should not be allowed to change to prevent tampering. Manifest 128 is associated with subset 304 of files, which include files allowed to change at (or in some examples, only at) run time. Such files may include executable files whose operation has little or no direct financial consequence. Manifest 130 is associated with subset 306 of files, which include files allowed to change at (or in some examples, only at) the time of upgrade. While the three subsets 302, 304, 306 of files are distinguished by conditions wherein the files are and/or are not allowed to change, other criterion or criteria could be used to formulate different subsets and/or additional subsets. For example, subsets of files could be based on size of the files, the device operated by execution of the files (e.g., metrology device(s), communication/radio device(s), shut-off valve(s), sensor device(s), etc.

In one example, each manifest may include version number(s) 302. In an example, the manifest may include a version number of an associated subset of update files. If a file within the subset of files associated with the manifest changes, then the version number of the manifest is changed (or the subset and associated manifest replaced). The version number allows the subset to be stored and later identified, based on version number. In an alternative example, each file (executable or data file) within the subset could be given a version number. However, in practice it frequently easier to increment the version number of the entire subset if one file is updated, and to thereby reduce version number complexity.

In the example shown, pathways 304 within a file system for each file in a subset may be provided, so that the endpoint is able to store, find, and/or execute programs/files and/or access data using the pathways.

Hash values 306 for a subset of files (and in some examples individual files) may be located in the manifest. Generally, hash values are not provided for files removed due to operation of the blacklist. In one example, higher level (e.g., delta file) file transfer integrity checks are used to verify that the delta file was not corrupted and/or tampered with during transfer. Failure of a comparison of hash values may indicate that one or more files has been tampered with by bad actors or that one or more unexpected runtime changes are present. If the hash of the manifest is used to indicate a failure to verify, hashes of individual files within the manifest may be used to locate possible cause(s) of the failure.

Figure 4:
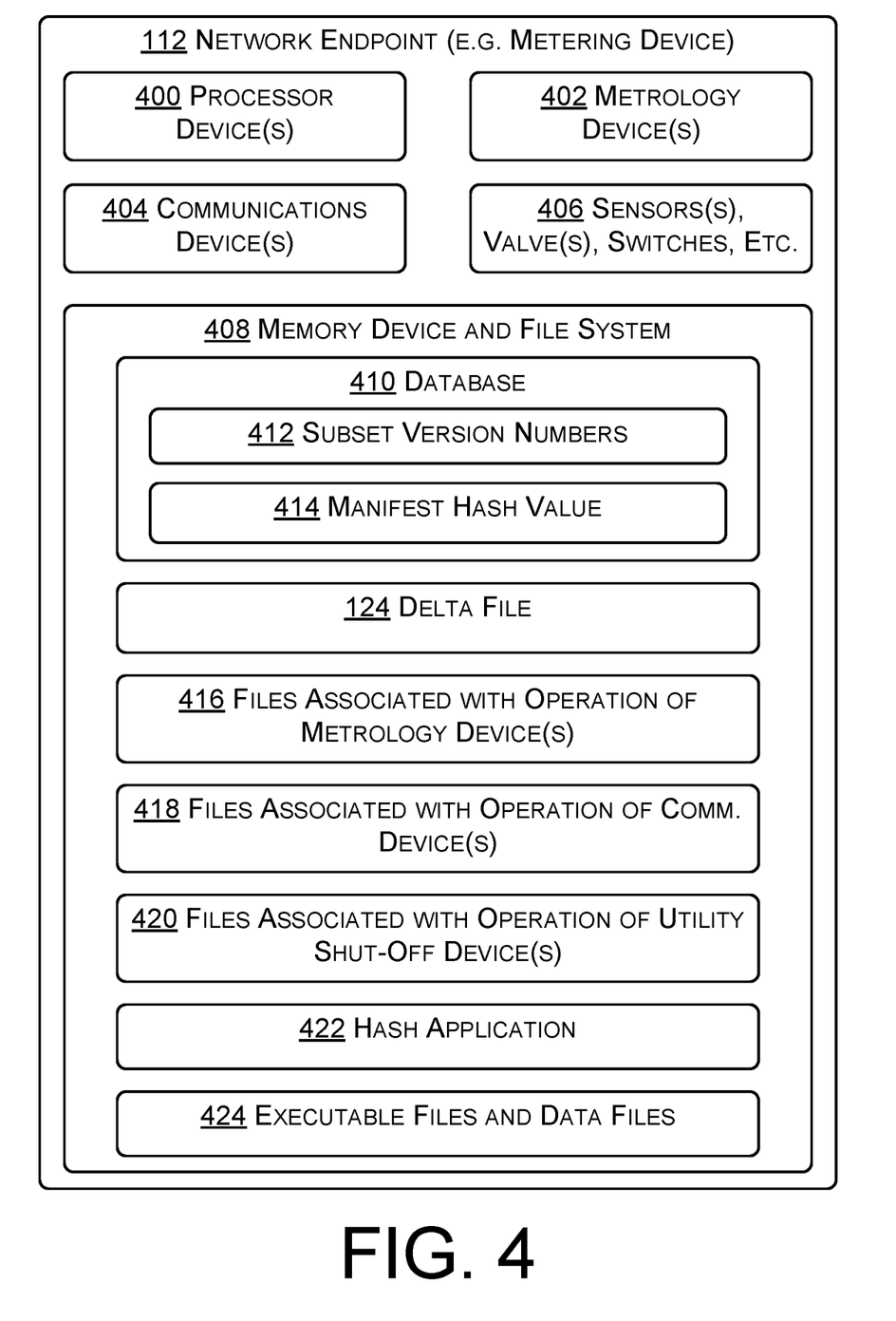
FIG. 4 is a block diagram showing an example of an endpoint configured to utilize the delta file. Using the delta file, subset(s) of the software resident and/or operable on an endpoint may be replaced by subsets of software contained by the delta file.

FIG. 4 shows an example of an endpoint 112 configured to utilize the delta file 124. Using the delta file 124, subset(s) of the software resident and/or operable on the endpoint 112 may be replaced by subsets of software contained by the delta file. In the example shown, the endpoint 112 is configured as a utility meter in a smart grid; however, the endpoint may be any device in the internet of things. A processor 400 may control one or more of metrology device(s) 402, communications, radio and/or modem device(s) 404, and/or sensor(s), valve(s) (e.g., a shut-off valve), switches 406, etc. The processor 400 may also be configured to communicate with memory device(s) 408, which may include random-access devices, read-only devices, flash memory, disk-based devices, solid state drives/devices, etc. The delta file 124 may be stored, at least temporarily, in the memory device 408 upon receipt.

A database 410 may be stored within the memory device and/or file system 408. In an example, the database 410 may include records including subset version number 412 and a hash value 414. In some examples, the path of files is also stored in the database 410. Accordingly, the database 410 stores much of the metadata obtained from the manifest within the delta file (as seen in FIG. 3).

In the example shown, the endpoint may include a plurality of files. The files may be involved in a wide array of activities, such as firmware, operating system, and applications for a wide variety of purposes, such as communications, metrology and other. As examples of the plurality of files (executable and data, etc.) files associated with the operation of metrology devices 416, files associated with the operation of communications devices 418, and files associated with the operation of sensors or utility shut-off devices 420 are shown. In an alternative example, files that are not allowed to change, files that are allowed to change at, or only at, runtime, and files that are allowed to change during, or only during, a system upgrade could additionally or alternatively have been shown. Accordingly, the files 416-424 are representative of a plurality of files operable on the network endpoint 112, and which may be updated by files within the delta file 124.

A hash application 422 is configured to hash files and/or subsets of files so that the output of the hashes could be compared to values provided by the manifest of the delta file. Accordingly, the hash application 422 facilitates a verification mechanism by which files provided by the delta file 124 can checked for corruption, and/or changes made by bad actors, and/or unexpected changes during runtime.

Executable files and data files 424 are representative of still further executable files and/or data files that may be defined in the memory device(s) 408 and/or updated by the delta file 124. Files, or portions of the files, from among the executable files and data files 424 may be replaced by those files and portions of files contained in the delta file 124.

Example Methods

Figure 5:
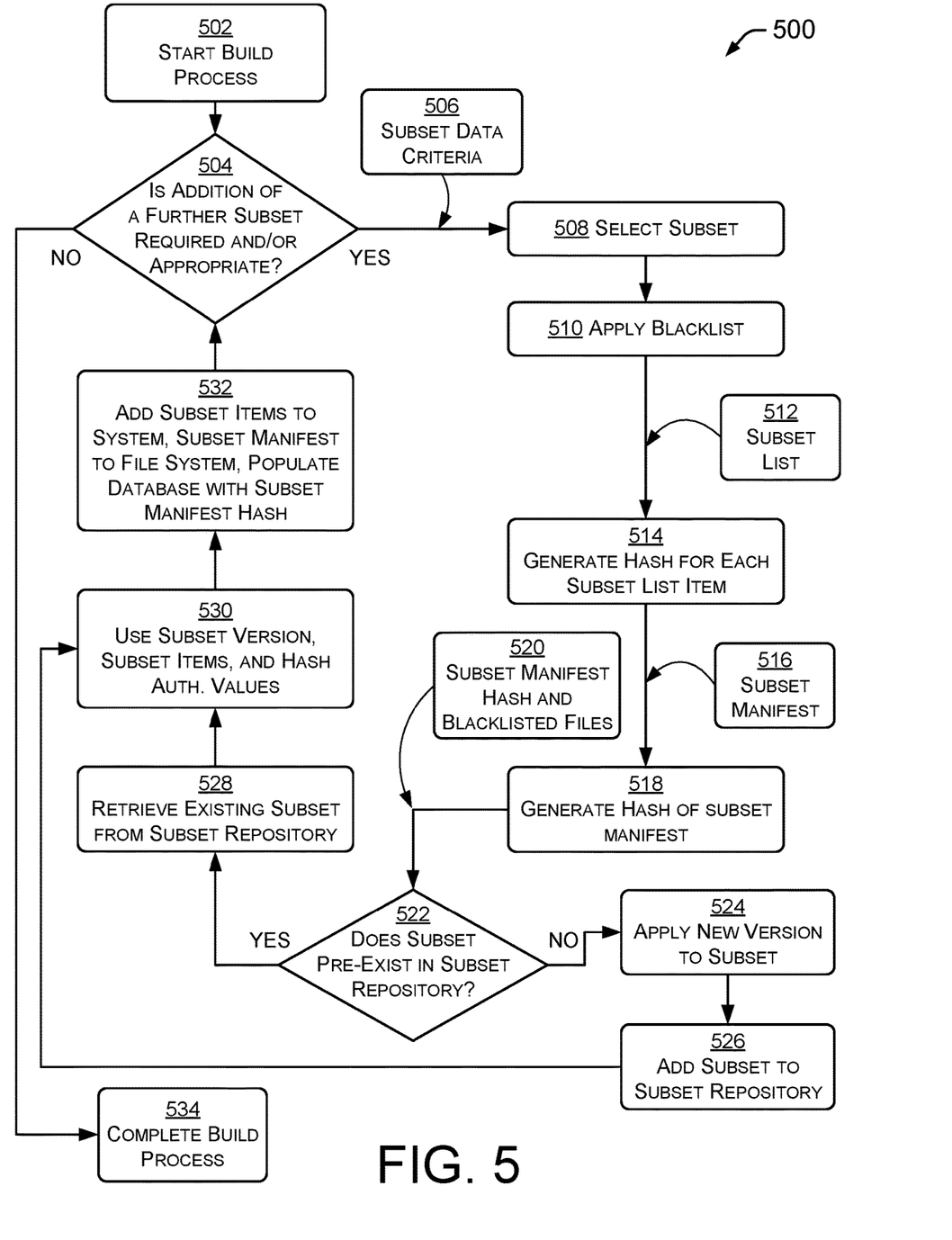
FIG. 5 is flowchart showing example operation of a computing system (e.g., a server, network manager and/or headend) and the creation of build-time system subsets for use in the software update of one or more network endpoints.
Figure 6:
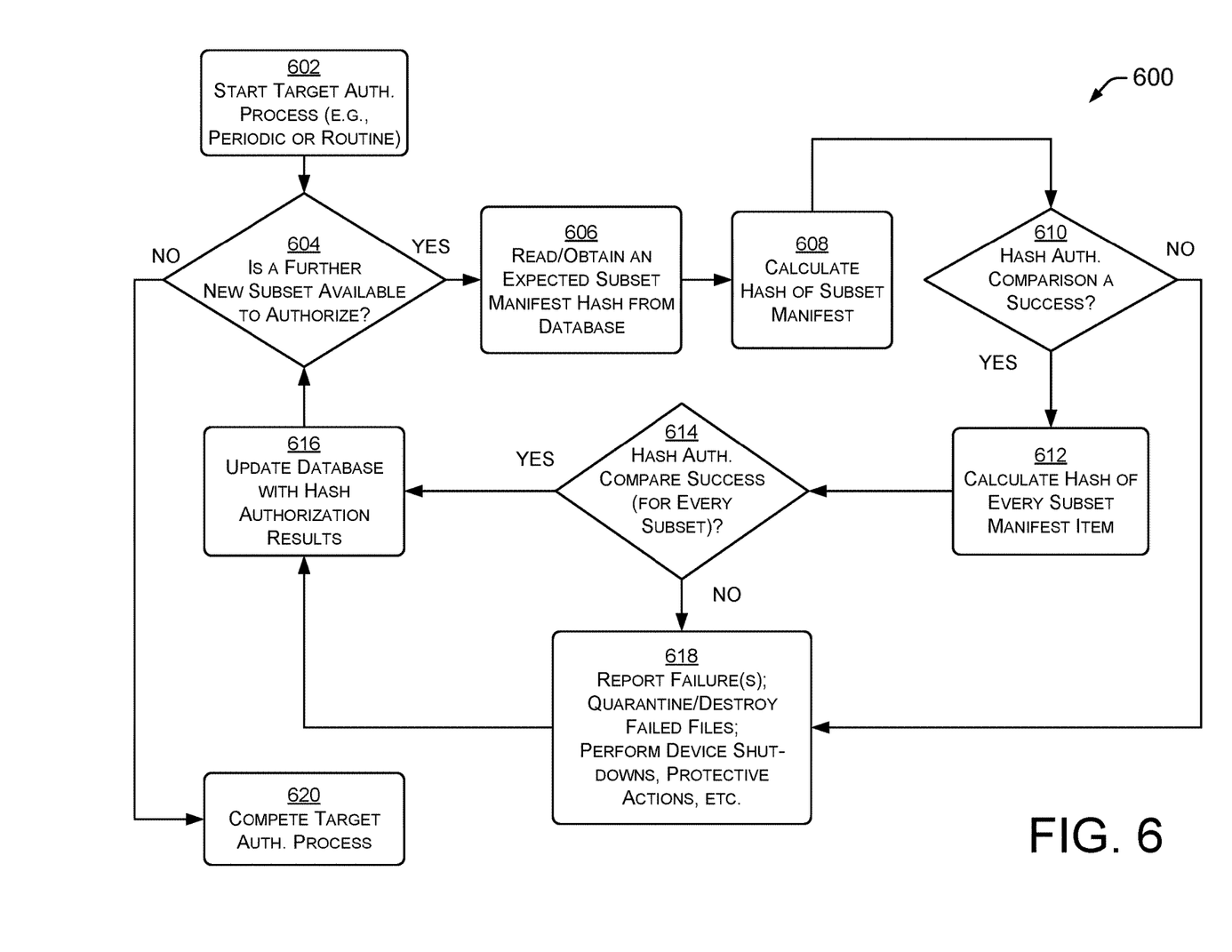
FIG. 6 is a flowchart showing example authentication of system subsets on a network endpoint, to provide either periodic or run-once support.
Figure 7:
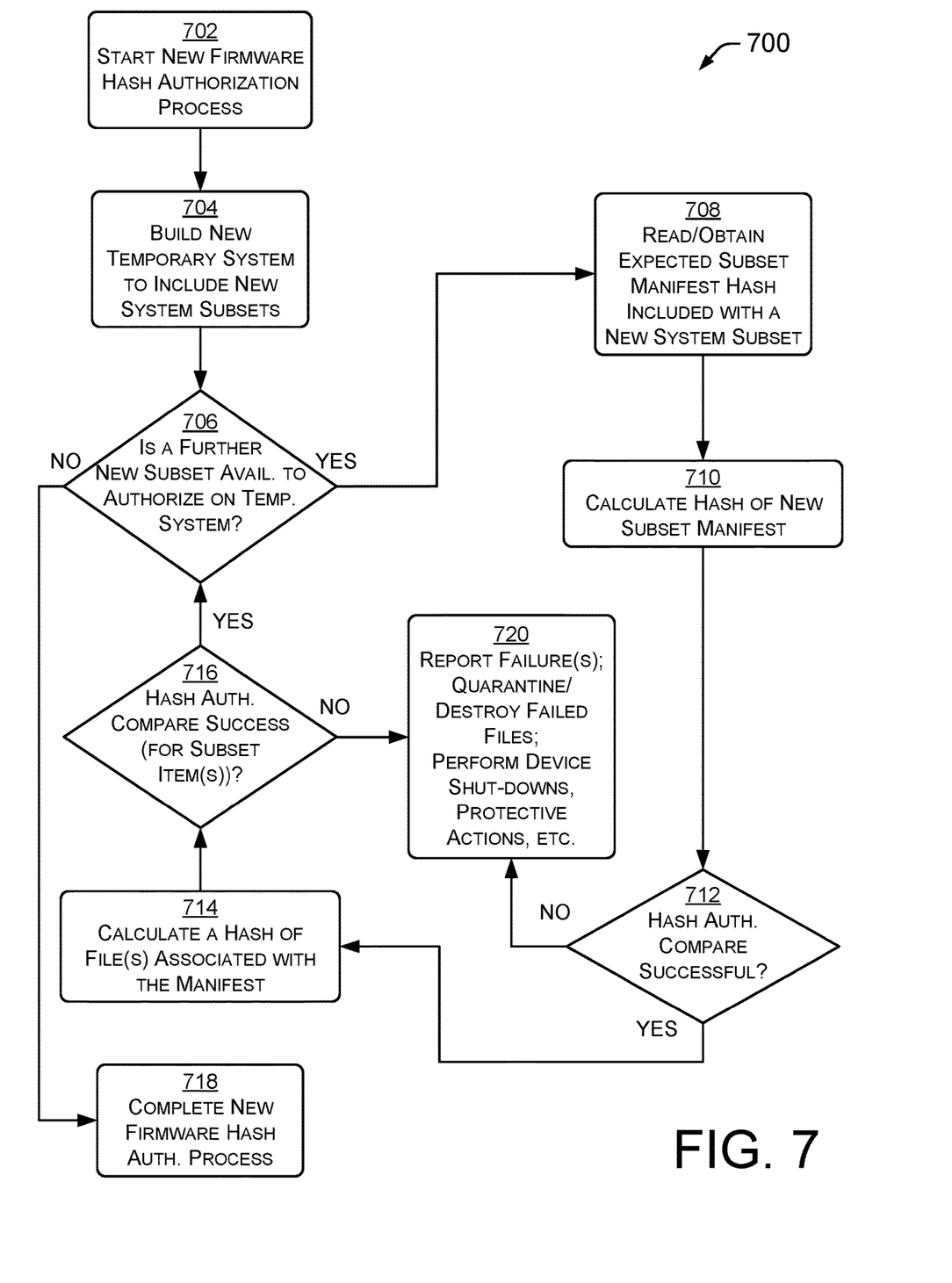
FIG. 7 is a flowchart showing example authentication of new system subsets on a network endpoint, to provide authentication prior to activation.

FIGS. 5-7 shows example methods and operation of a central office and of a plurality of network devices. The methods and operations show examples by which the integrity of files within a system including remotely connected devices may be verified, as a guard against accidental corruption and the intentional actions of bad actors and/or unexpected changes at runtime. The methods and operations may be performed and/or directed by any desired processor, memory devices, integrated circuit, logic devices, programming, etc.

In some examples of the techniques discussed herein, the methods of operation may be performed by one or more application specific integrated circuits (ASIC) or may be performed by a general-purpose processor utilizing software defined in computer readable media. In the examples and techniques discussed herein, the memory may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

While functional blocks and device are shown to provide an operable example, such blocks and devices and their described functionality can be shared, mixed, or redistributed among other blocks and other devices in other examples.

As defined herein, computer-readable media does not include transitory media, such as modulated data signals and carrier waves, and/or signals.

FIG. 5 shows an example method and operation 500 of a computing system (e.g., a computing system at a central office, or a "cloud" location) and the creation of build-time system subsets for use in the software update of one or more network endpoints. In the example, a plurality of subsets of files (e.g., executable and/or data files) are formed, wherein each subset is based on a particular criterion or criteria. Individual files, not matching a criterion, may be processed singly. Subsets may be trimmed by a blacklist to remove files (perhaps only for purposes of hashing) that tend to change and would return a variable hash result. A manifest is created for association with each subset, and may include metadata about the subset such as version number, hash value and files paths to files in the subset. A repository may be updated to include any new subset(s) of files, and may save processing cycles and time. The output of the example method 500 may include a delta file having a plurality of subsets, and associated with each subset a manifest including metadata about the respective subset, such as version number, hash value, and file pathways. The files pathways assist the endpoint to store, find and/or execute each file in a proper location in its file system.

At block 502, a build process is started. The build process creates one or more subsets of files, which may include changes to, or replacements for, existing files on remotely connected and/or networked endpoints. In some examples, the build process may include additional new files or deletion of previously-present files. The subsets may be associated with respective manifests. Each manifest may include hash values, version numbers and/or pathways associated with the subset of files and/or the files themselves. The build process may be performed routinely, and updates (e.g., in the form of delta files) provided to at least some endpoints in an on-going manner.

At block 504, it is determined if the addition of a further subset is required and/or appropriate. The number of subsets required may depend on the needs of the networked endpoints, the availability of updates, the currently available network bandwidth, endpoint battery power, and/or other factors. Each subset of files may be used to replace and/or update files that are on one or more endpoint devices, such as utility meters. By configuring a subset of the files at a headend device, network bandwidth is conserved, as well as battery power if the networked devices are battery-powered.

At block 506, a subset criterion or criteria, which will be shared by, and/or which will aid in the identification of, files to be added to the subset of files is determined and/or selected. The build process may define subsets in any desired manner. The subset criterion or criteria allows selection of files that may have similar functional utility, such as files related to operation of metrology devices. The subset criteria may be based on practicality. If a change to one file may require a change to another file, then both files may be included in a subset. Alternatively or additionally, the subset criterion or criteria allows selection of files bases on size or a range of sizes, which may be useful to control the burden on network bandwidth and/or battery usage. Accordingly, any desired subset data criterion or criteria may be constructed, obtained and/or utilized.

At block 508, the subset of files is selected, according to criterion or criteria as applied to files that are on the endpoint(s). In an example, the endpoint may have a thousand files, one hundred of which are related to operation of a radio. If the criterion is radio-operation, the selected subset will be the one hundred radio-related files. The subset may include executable files (i.e., "applications") and/or may include data files, or any other file type.

At block 510, a "blacklist" is applied. After selection of files for inclusion in the subset (at block 508) it is recognized that some files are known to be unreliable candidates for hashing. That is, perfectly valid forms of such files may contain code, settings, data, linked files and/or other elements that potentially change, and which cause the hash value of the file to be unreliable. Accordingly, to avoid a likely hash error, these files are temporarily removed from the subset (or temporarily ignored), at least when files in the subset are hashed.

At block 512, the subset list—that does not include the "blacklisted" files—is determined, and sent to a hash application. At block 514, a hash is generated for each subset file. Accordingly, each of the files in the subset (except those on the blacklist due to their unreliable hash values) is hashed.

At block 516, a subset manifest (i.e., a manifest for a subset of files) is generated. The subset manifest may include metadata for each file or the entire subset of files associated with the manifest, including the path to each file, hashes of each file and/or the entire subset of files, and/or a version number each file and/or the subset of files. In an example, a path for each file, hashes for each file and the entire subset, and a version number for the entire subset is included in the manifest. At block 518, a hash of the entire subset of files associated with the manifest is generated. The input to this hash operation will include all of the files that were previously hashed and optionally their respective hash values.

At block 520, the hash result of the previous block may be added to the subset manifest. Accordingly, the manifest includes metadata associated with a plurality of files (the selected "subset" of files present on an endpoint), including hashes, paths and version number.

At block 522, the repository (e.g., repository 216 of the central office computing device of FIG. 2) is checked for to see if the identical subset is already in the repository. If not, at block 524 the new version number is assigned to the subset of files. At block 526, the manifest and associated subset of files is added to the repository. At block 528, if the subset does exist in the repository, it is retrieved from the repository.

At block 530, within the manifest, the subset version number, the subset items, the hash values of each subset items, and the hash value of the entire subset are known and assembled, having been either obtained from, or added to, the repository.

At block 532, subset items (i.e., the files in the manifest and those that were blacklisted) are added to the appropriate locations in the file system (e.g., file system in memory 204 of the computing device 102 of FIG. 2) of the central computing device. The subset manifest is also added to the file system. The database (e.g., database 206 of FIG. 2) is populated with the subset's version and subset's manifest hash, i.e., the hash of the subset manifest.

At block 504, the process determines if a further subset is required. In an example, a common feature (i.e., common to each selected file), concept and/or factor is used to create each subset. This results in more manageable delta files, less burden on the network, and less burden on battery-powered networked devices. Accordingly, selection of files according to several subset criteria may be advantageous. At block 504 the process either iterates or terminates. If the process terminates at block 534, the build process is completed. Upon completion, a delta file (e.g., delta file 124 of FIG. 3) is ready for transmission to one or more networked devices. Additionally, the build-time subsets of the headend computing device (e.g., build-time subsets 204 of computing device 102 of FIG. 2) has been updated to include a manifest associated with a subset data criteria (e.g., criterion or criteria 506), a plurality of files (executable files, data files, etc.), hash values of each file, a hash value of the manifest, and a version number of the manifest associated with the subset.

FIG. 6 shows an example method 600 of authentication of system subsets on a network endpoint, to provide either periodic or run-once support. In an example, a delta file has been received at a network endpoint, such as a utility meter or networked device in the internet of things. The delta file may include a plurality of manifests and corresponding subsets of files. Each manifest may include a version number, paths for each file, and hashes of each file and all of the files. In example authentication, each subset of files is hashed, and the hash result is compared to an expected value, from the manifest. Additionally, each file is hashed, and the hash result is compared to an expected value, from the manifest. Hashing each file may explain the source of an error in the comparison of hashes of the subset of files. Files on the endpoint may be updated using subsets of files from the delta file. The database of the endpoint may be updated using information from the manifest.

At block 602, the authentication process is started on the "target," i.e., the networked device that has received (i.e., was "targeted" with) the delta file. Accordingly, the endpoint has received the delta file, and begins the process of verifying the contents of the delta file, updating files on the endpoint, and updating the database of the endpoint according to metadata of the manifest. At block 604, review of the delta file indicates whether a further new subset is available to authorize. In an example, the process is iterated once for each manifest (e.g., the manifests 126, 128, 130 of FIG. 3) and an associated subset of files found in the delta file.

At block 606, an expected hash value of a subset of update files is read from a manifest of the delta file (or read from the database into which the metadata from the manifest was stored). In an example, the subset of files was constructed by the headend 102 according to a purpose or criteria, a hash was made, and stored in the manifest. At block 606 that hash is removed from the manifest, or from the database, if the hash value was previously transferred from the manifest to the database. In the example of FIG. 3, hash values 306 are seen in the manifest 126 of the delta file 124. In the example of FIG. 4, the hash values have been moved from the manifests in the delta file, and stored as hash values 414 in the database 408.

At block 608, a hash of the subset of files associated with a manifest is calculated. In the example of FIG. 4, the hash application 422 is used to perform the hash calculation.

At block 610, the hash value calculated at block 608 (i.e., a hash of the entire subset of files) is compared to the hash value read from the manifest or database at block 606. That is, the hash performed by the hash application 422 (of FIG. 4) of the endpoint 112 (and calculated at block 608) is compared to the hash calculated by the build process 500 (of FIG. 5) at the headend 102, and read from the manifest or database at block 606. The comparison may be a success (two identical hash values), indicating that the files of the manifest are valid, not corrupted, and/or not tampered with. Alternatively, the comparison may be a failure, indicating corruption, errors, and/or actions of a bad actor.

Assuming success at block 610, at block 612 a hash value of every file in the manifest is calculated. In an example, the hash application 422 continues to be used to perform the hash calculations. At block 614, it is determined if the hash values for each file in the subset of files of the manifest is accurate. That is, the endpoint hashes each file in a subset obtained from the delta file and compares each hash value to a respective value from the manifest (which may have been stored in the database). Blocks 612 and 614 assume that hash values for every file in a particular subset are compared. Additionally, files that were blacklisted will not have hash values, and accordingly hash values are not compared.

Assuming success at block 614, at block 616 a database of the endpoint is updated with the authorization results. In the example of FIG. 4, the database 410 is updated to include paths to the newly authorized/validated files, hashes of those files, and a version number of the subset associated with those files. The files themselves may be installed (according to the paths) in the device memory and file system 408 of the endpoint 112.

Assuming failure at either of blocks 610, 614, at block 618 the failure of the authorization is reported. In the example of FIG. 1, the failure of the update to authorize is reported to the central office 102. The endpoint may take a number of additional and/or alternative actions responsive to the failure. In an example, the files that failed to authorize or validate (due to the failure of the hashes to match) may be prevented from execution or access (e.g., "quarantined"). The failed files may be destroyed (e.g., erased). In a further example, responsive to the failure of the files to authenticate, functionality of the endpoint may be shut down. If the endpoint is an electricity meter, a shut-off switch (e.g., switch 406 in FIG. 4) may be used to shut off service. This may be appropriate if the failure to authenticate is assumed to be related to a cyber-attack and fraud. If the endpoint is a gas meter, a shut-off valve (e.g., valve 406 in FIG. 4) may be used to shut off service. This may also be appropriate if the failure to authenticate is assumed to be related to a cyber-attack and fraud.

In an example, failure of subset(s) of files to verify (such as by comparison of hash values) may trigger action(s). In a further example, failure of a first subset (or a particular type or classification of subset) to verify may cause a first action, while failure of a second subset (or a particular type or classification of subset) to verify may cause a second action. Accordingly, the type, classification and/or identify of the subset of files that failed to verify may be used to determine an action to be taken.

The type, classification and/or identify of subset(s) (that failed to verify) may include subsets of legally or financially relevant files and/or executables, subsets based on third-party developer applications, subsets related to communications, subsets related to metrology, subsets related to the operating system, subsets of files that have different rules regarding file-changeability, subsets associated with switching, valves, shut-off, etc. Thus, the subsets may be constructed in any desired manner, to include groupings of any desired files and/or types of files.

Actions which may be taken—responsive to one or a combination of subset verification-failures—may include any desired function. A number of examples are illustrative. In a first example, the system could be rebooted, and/or the hash authentication could be run a second time. In a second example, the rate of periodic hash authentications could be changed. The change could be over a range from, on one end, disabling to preserve failure state, to on the other end, increasing frequency and monitoring more closely. In a third example, a different mode of an existing feature could be triggered, e.g. the mode might be related to a logging level to isolate a root cause of the authentication/verification failure. In a fourth example, a physical medium could be disabled to prevent propagation of risk over communication pathway, e.g., ethernet, hard-wired, wireless network, USB, etc. In a fifth example, a physical communication medium could be enabled/disabled to assist and/or to change troubleshooting, e.g., ethernet, hard-wired, wireless network, USB, etc. In a sixth example, an external user and/or group credentials could be enabled or disabled, (e.g., to allow only admin logins). In a seventh example, network routing to/from one or more specified or classes of external IP addresses could be enabled and/or disabled. In an eighth example, an internal process (or subset of processes) may be restricted from access to resources or communications with other processes, (e.g. file/directory, additional memory, and/or CPU). In a ninth example, processes may be stopped or prevented from using functionality not critical to unit's (e.g., networked device's) primary purpose. This may involve booting a pre-loaded 'failsafe' or 'secure-safe' image that has increased security measures with minimal functionality, e.g., no firmware download support.

Accordingly, failure of verification and/or authentication of one or more subsets of files (e.g., from the examples discussed above) could be mapped an action to be performed (e.g., from the examples discussed above). Thus, by linking the failures (to verify and/or authenticate) of one or more subsets or groups of subsets to one or more actions, appropriate measure(s) may be taken, responsive to failure(s). Mixing and/or matching of failure to verify of any subset(s) and any actions may be advantageous, depending on circumstances and/or design requirements.

Assuming that no further subsets and associated manifests are yet to be authorized at block 604, at block 620 the authorization process is completed at the endpoint. A completed authorization process may include a file system populated with files obtained from the delta file that have been validated. This new file system (or repopulated original file system) replaces outdated files in the file system of the endpoint.

FIG. 7 shows an example authentication 700 of new system subsets on a network endpoint. The authentication is performed prior to activation of update files provided by a delta package.

At block 702, a hash authorization process is started on new firmware, which was transmitted to the network endpoint within the delta file.

At block 704, a new temporary system is built. The new system may include one or more subsets of files. Each subset may be based on criteria that each file within the subset has in common.

At block 706, a delta file may include a plurality of manifests and associated subsets of files. A determination is made if there is a further manifest and associated subset of files to authorize. Assuming the determination is positive, at block 708 a processor on the endpoint reads or otherwise obtains an expected hash value of the subset from the manifest. That is, the hash value put into the manifest by the headend computer, following the hash of the subset by the headend computer is retrieved from the manifest. At block 710, a hash of the subset of files, received in the delta file, is calculated. The calculation may be made by a hash program operating on the endpoint. At block 712, the expected hash of block 708 is compared to the calculated hash of block 710.

If the values are the same (indicating a successful validation), at block 714 a hash value of every file associated with the manifest (i.e., every file in the subset) is calculated.

At block 716, if every file has a calculated hash value equal to the expected hash value (i.e., the hash value from the manifest), then at block 706 it is determined if further manifests and associated subsets of files are available (such as from the delta file) for verification. Blocks 714 and 716 assume that hash values for every file are compared. Additionally, files that were blacklisted will not have hash values, and accordingly hash values are not compared.

Assuming at block 706 that there are no further manifests and associated subsets of files to verify, at block 718 the new firmware hash authorization process completes the temporary system of new files of the various subsets that were validated.

Conversely, if the hash was unsuccessful at blocks 712 or 716, at block 720 the process ends in failure, and no new temporary system is validated. In examples, the failure may trigger some or all of the responses seen at block 618 in FIG. 6.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A network device, comprising:
   a processor;
   a memory device in communication with the processor, the memory device storing a plurality of files and a delta file;
   wherein the delta file comprises:
      a first manifest and a second manifest, comprising a first expected hash value of a first subset of files and a second expected hash value of a second subset of files, respectively; and
      the first subset of files associated with the first manifest and the second subset of files associated with the second manifest, wherein the first subset of files and the second subset of files include replacements for at least some of the plurality of files;
   instructions that, when executed by the processor, perform a method comprising:
      hashing at least some of the files in the first subset of files to calculate a first calculated hash value;
      hashing at least some of the files in the second subset of files to calculate a second calculated hash value;
      comparing the first expected hash value to the first calculated hash value;
      comparing the second expected hash value to the second calculated hash value;
      determining, based at least in part on comparing the first expected hash value to the first calculated hash value, and/or based at least in part on comparing the second expected hash value to the second calculated hash value, that at least one of the first subset of files or the second subset of files is invalid; and
      based at least in part on the determination of invalidity:
         reporting the determination of invalidity; and
         continuing to use previously installed files without using files from at least one of the first subset of files and the second subset of files.

2. The network device as recited in claim 1, wherein based at least in part on the determination of invalidity, the method additionally comprises:
   activating a shut-off switch or valve to prevent consumption of a metered commodity.

3. The network device as recited in claim 1, wherein:
   the first subset of files comprises files that are changeable only at runtime; and
   the second subset of files comprises files that are changeable only in response to a system upgrade.

4. The network device as recited in claim 1, wherein the delta file additionally comprises:
   a plurality of paths to a plurality of respective files within the first subset of files and the second subset of files.

5. The network device as recited in claim 1, wherein:
   the first subset of files comprises files that, upon execution, cause operation of a metrology unit; and
   the second subset of files comprises files that, upon execution, cause operation of a communications unit.

6. The network device as recited in claim 1, wherein:
   the delta file is configured to update less than all of the plurality of files stored on the memory device; and
   the first subset of files comprises files that are executable to operate a first hardware component, and the second subset of files comprises files that are executable to operate as at least part of an operating system of the network device.

7. The network device as recited in claim 1, wherein the delta file additionally comprises:
   a first version number associated with the first subset of files and a second version number associated with the second subset of files.

8. A method of creating an update for distribution to network endpoints, comprising:
   under control of one or more processors configured with executable instructions:
      selecting a subset of files to update a plurality of files stored in a memory device of a network endpoint to be updated;
      generating a hash of each file within the subset of files;
      generating a hash of the subset of files;
      creating a delta file comprising:
         the subset of files;
         the hash of the subset of files; and
         the hash of each file within the subset of files; and
      sending the delta file to the network endpoint, wherein the subset of files within the delta file is less than a number of the plurality of files stored in the memory device of the network endpoint.

9. The method of claim 8, wherein the selecting is based at least in part on:
   determining files that are related to operating a metrology device; and
   configuring the subset of files with the determined files.

10. The method of claim 8, wherein the selecting is based at least in part on:
   determining files that are related to operating a communication device; and
   configuring the subset of files with the determined files.

11. The method of claim 8, wherein the selecting is based at least in part on:
   determining files that are used to run a hardware device; and
   configuring the subset of files with the determined files.

12. The method of claim 8, wherein the selecting is based at least in part on:
   determining files that are of a particular range of sizes; and
   configuring the subset of files with the determined files.

13. The method of claim 8, wherein the method additionally comprises:
  applying a blacklist to remove files from the subset of files prior to generating the hash of the subset of files, wherein the blacklist removes files from the subset of files that do not repeatedly provide a same hash value.

14. The method of claim 8, wherein the method additionally comprises:
  determining if the subset of files exists in a repository;
  if the subset of files exists in the repository, then:
    retrieving existing subset of files from the repository;
  if the subset of files does not exist in the repository, then:
    applying a new version number to the subset of files; and
    adding the subset of files to the repository.

15. A method of operating an endpoint in a network, comprising:
  under control of one or more processors configured with executable instructions:
  receiving a delta file comprising:
    a first manifest comprising a first expected hash value of a first subset of files;
    a second manifest comprising a second expected hash value of a second subset of files;
    the first subset of files associated with the first manifest; and
    the second subset of files associated with the second manifest, wherein the first subset of files and the second subset of files include replacements for at least some of a plurality of files in a memory device of the endpoint;
  hashing at least some of the files in the first subset of files to calculate a first calculated hash value;
  hashing at least some of the files in the second subset of files to calculate a second calculated hash value;
  comparing the first expected hash value to the first calculated hash value;
  comparing the second expected hash value to the second calculated hash value;
  determining, based at least in part on comparing the first expected hash value to the first calculated hash value, and/or based at least in part on comparing the second expected hash value to the second calculated hash value, that at least one of the first subset of files or the second subset of files is invalid; and
  based at least in part on the determination of invalidity:
    reporting the determination of invalidity; and
    continuing to use previously installed files without using files from at least one of the first subset of files and the second subset of files.

16. The method of claim 15, wherein:
  hashing at least some of the files in the first subset of files comprises hashing files that are allowed to change only at runtime; and
  hashing at least some of the files in the second subset of files comprises hashing files that are allowed to change only in response to a system upgrade.

17. The method of claim 15, wherein:
  hashing at least some of the files in the first subset of files comprises hashing files that, upon execution, control operation of a metrology unit; and
  hashing at least some of the files in the second subset of files comprises hashing files that, upon execution, control operation of a communications unit.

18. The method of claim 15, wherein:
  hashing at least some of the files in the first subset of files comprises hashing files that, upon execution, control operation of a first hardware device; and
  hashing at least some of the files in the second subset of files comprises hashing files that, upon execution, control operation of a second hardware device.

19. The method of claim 8, wherein selecting the subset of files comprises:
  selecting files based on rules that regulate when files are allowed to change; and
  selecting files based on a device associated with each respective file.

20. The method of claim 19, additionally comprising:
  generating a manifest for the subset of files, including a version number for the subset of files and the hash of the subset of files;
  generating a hash of the manifest; and
  including the manifest and the hash of the manifest in the delta file.

* * * * *